April 19, 1932.　　　G. VIRNEBURG　　　1,855,075
FRYING PAN
Filed Feb. 12, 1931
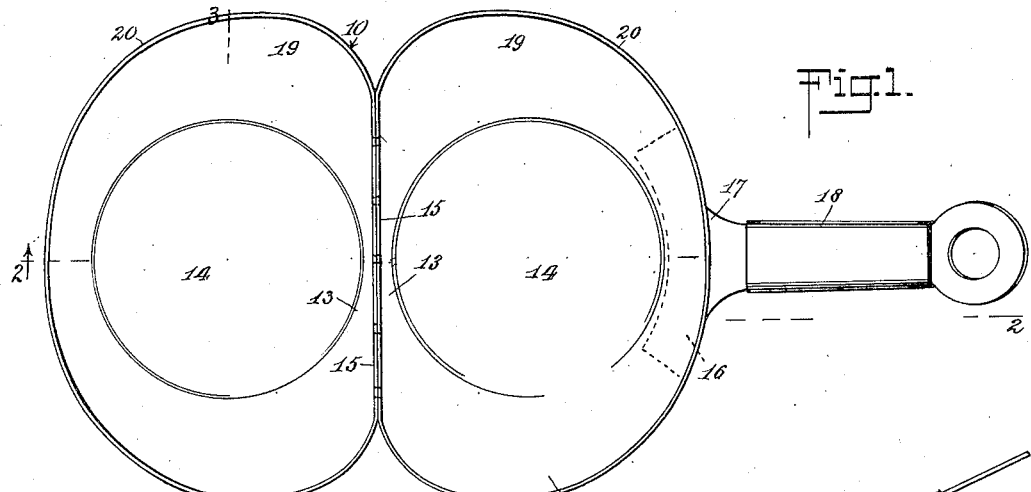
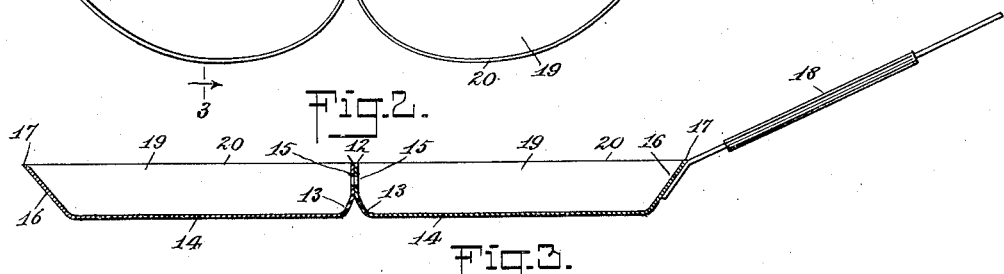
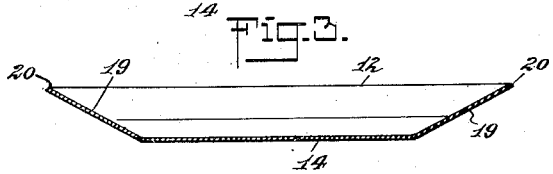
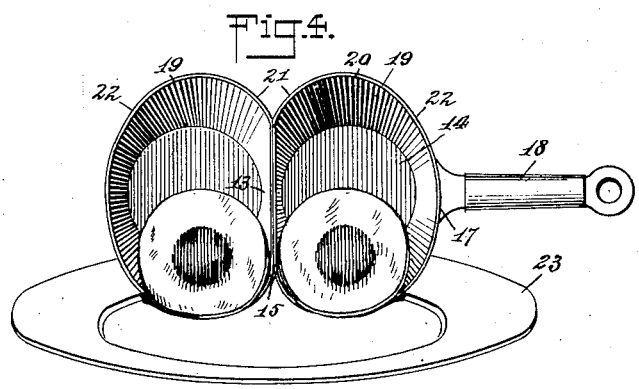
WITNESSES
INVENTOR
George Virneburg
BY
ATTORNEYS Patented Apr. 19, 1932

1,855,075

UNITED STATES PATENT OFFICE

GEORGE VIRNEBURG, OF NEW YORK, N. Y.

FRYING PAN

Application filed February 12, 1931. Serial No. 515,360.

An object of the invention is to provide a pan and particularly a pan for frying eggs which will enable a cook to conveniently fry eggs and to transfer them to a plate.

Another object of the invention is to provide a pan with which the eggs may be readily fried apart from each other, the pan being constructed to direct the eggs toward each other as they are transferred to a plate.

Still another object of the invention is to construct a pan having a mold or molds in each of which an egg may be fried in the form of the mold and which serves to evenly distribute the white of the egg.

Further objects of the invention are to construct the pan in a manner which will require little fat during the frying process so that the egg will have a good taste when cooked and which will lessen the possibility of the burning of portions of the egg or eggs during the cooking process, while making it possible to fry the eggs very quickly.

Still a further object of the invention is to provide a pan having a plurality of molds, in which eggs may be fried, spaced from each other, the molds each having sides flared from the bottom, the flares at the opposite sides of each mold continuing to the peripheries of the said sides and the upper adjacent edges of the mold being parallel to permit the cook to readily transfer the fried eggs to a plate with the eggs disposed close together on the plate.

Additional objects of the invention will appear in the following specification in which the preferred form of the invention is described.

In the drawings similar reference characters refer to similar parts in all the views, of which Figure 1 is a plan view illustrating the frying pan, Figure 2 is a sectional view on the line 2—2 of Figure 1, Figure 3 is a sectional view on the line 3—3 of Figure 1, and Figure 4 is a perspective view showing the manner in which the eggs may be transferred from the pan to a plate.

By referring to the drawings it will be seen that there is illustrated a pan having two molds, but it will be understood that any desired number of molds may be used, disposed end to end, as illustrated in the drawings.

In Figure 1 the pan is shown with two molds 10 and 11, each mold having an end 12 which is flared at 13 a distance from the bottom 14 of the mold, the said end 12 above its flared portion 13 extending at 15 parallel with the adjacent end 12 of the other mold. These ends 12 may be riveted together, or welded, or, if desired, they may be made above their flared portions 13 of one piece of metal. The opposite ends 16 of the molds are preferably flared from the bottom 14 to the pan's periphery 17 and extending from one of these ends 16 there is a handle 18.

The opposite sides 19 of each mold, as illustrated in Figure 3 of the drawings, are flared from the bottom 14 of the mold to the periphery of the mold at 20. It will further be seen by referring to Figures 1 and 4 of the drawings that the flare at the sides 19 of the mold is greater at 21 than at the points 22 adjacent the ends 16 of the molds, so that when the pan is turned, as illustrated in Figure 4, by means of its handle 18, the eggs which have been fried in the molds will be directed towards each other on to the plate 23.

Not only will the pan serve to fry eggs spaced from each other with very little fat and very quickly, but the eggs will be shaped while being cooked with the whites of the eggs evenly distributed around the eggs and without danger of burning any portion of the eggs, which avoids the present difficulty of preventing the burning of the edges of the eggs. As will be seen, the edges of the eggs will be spaced from the bottoms of the molds, the heat being evenly concentrated over their small bottoms, which permits of the cooking of the eggs very quickly.

What is claimed is:

1. A pan having two molds rigidly secured together, each of the molds having an approximately circular bottom, the upper portions of adjacent ends of the molds being parallel and the opposite sides of the molds adjoining the said ends being flared from the bottoms of the molds to the periphery of the pan, and a handle extending from the pan at an end of a mold opposite the said adjacent ends to permit the turning of the pan to slide the contents of the two molds off together at a side of the pan.

2. A pan having two molds rigidly secured together, each of the molds having an approximately circular bottom, the adjacent ends of which are flared for a distance above the bottoms of the molds, the upper portions of the said adjacent ends being disposed substantially parallel and side by side, and the opposite sides of the molds adjoining the said ends being flared from the bottoms of the molds to the periphery of the pan, and a handle extending from the pan at an end of a mold opposite the said adjacent ends, to permit the turning of the pan to slide the contents of the two molds off together at a side of the pan.

3. A pan having two molds rigidly secured together with adjacent ends disposed at each other, each of the molds having an approximately circular bottom, the ends of the molds being flared a distance from the bottoms of the molds, the pan having sides at the molds which are flared from the bottoms of the molds to the periphery of the pan, the flares at the said sides being greater adjoining the said adjacent ends than at the opposite ends of the mold to serve to direct the eggs in the direction of each other as they are transferred to a plate, and a handle extending from one of the said opposite ends of the pan, to permit the turning of the pan to slide the contents of the two molds off together at a side of the pan.

4. A pan having two molds with adjacent ends disposed at each other, each of the molds having an approximately circular bottom, the ends of the molds being flared a distance from the bottoms of the molds, the pan having sides at the molds which are curved in the direction of each other at the said adjacent ends of the molds and with the said sides flared from the bottoms of the molds to the periphery of the pan, the flares at the said sides being greater at their said curved portions at the adjacent ends of the molds than at the opposite ends of the molds to serve to direct eggs in the direction of each other as they are transferred to a plate, and a handle extending from one of the said opposite ends of the pan.

GEORGE VIRNEBURG.